United States Patent [19]

Mohilef

[11] Patent Number: 5,289,795
[45] Date of Patent: Mar. 1, 1994

[54] EDIBLE RODENT HABITAT

[75] Inventor: David M. Mohilef, Chatsworth, Calif.

[73] Assignee: Pet Center, Inc., Los Angeles, Calif.

[21] Appl. No.: 863,841

[22] Filed: Apr. 6, 1992

[51] Int. Cl.⁵ .............................................. A01K 39/00
[52] U.S. Cl. .................................. 119/51.01; 119/15; 119/18
[58] Field of Search ................ 119/51.01, 51.03, 29, 119/29.5, 18, 61, 3, 15; 426/2, 74, 805

[56] References Cited

U.S. PATENT DOCUMENTS

| | | | |
|---|---|---|---|
| 1,718,432 | 6/1929 | Qualmann | 119/18 |
| 1,741,194 | 12/1929 | Levine | 119/61 |
| 1,899,508 | 2/1933 | Klein | 119/18 |
| 2,306,312 | 12/1942 | Hyde | 119/57.8 |
| 2,593,577 | 4/1952 | Lewis | 119/51.03 X |
| 3,049,093 | 8/1962 | Oliver | 119/18 |
| 3,200,790 | 8/1965 | Anderson | 119/51.03 |
| 3,664,303 | 5/1972 | Baensch | 119/51.03 |
| 3,699,925 | 10/1972 | Van Dongen | 119/18 |
| 3,699,927 | 10/1972 | Van Dongen | 119/61 |
| 3,882,257 | 5/1975 | Cagle | 426/805 X |
| 4,260,635 | 4/1981 | Fisher | 426/74 X |
| 4,985,964 | 1/1991 | Lawson | 426/805 X |
| 5,052,342 | 10/1991 | Schneider | 119/51.03 |
| 5,084,297 | 1/1992 | Merrick | 426/805 X |
| 5,149,550 | 9/1992 | Mohilef | 426/805 X |

*Primary Examiner*—Gene Mancene
*Assistant Examiner*—Thomas Price
*Attorney, Agent, or Firm*—Virginia H. Meyer

[57] ABSTRACT

The present invention provides a new product for small animals such as rodents (e.g., gerbils, mice, rats, hamsters, guinea pigs, chinchillas, rabbits, etc.) and the like. The new product is comprised of a hollow housing, such as bone or pipe, having a cavity therein which is accessible from outside the housing by at least one opening. The cavity is large enough for the animal(s) to burrow in and is filled with food suitable for the animals to eat or nibble on.

23 Claims, No Drawings

EDIBLE RODENT HABITAT

FIELD OF THE INVENTION

This invention relates to a novel device for small animals such as rodents, e.g., mice, rats, hamsters, gerbils, guinea pigs, rabbits, and chinchillas, that are maintained in captivity. The new device is suitable for small animals to both burrow in and nibble on.

BACKGROUND OF THE INVENTION

Rodents, e.g., mice, rats, hamsters, gerbils, guinea pigs, rabbits, chinchillas, etc., are small mammals characterized by large incisors adapted for gnawing or nibbling. These animals are also characterized by the fact that they burrow or tunnel into the ground or narrow and snug places for habitation or refuge. In the wild, rodents have abundant opportunity to burrow and to use their incisors for gnawing or nibbling. Such is not the case when rodents are maintained in captivity either as pets or for commercial or experimental purposes.

There is a need for a device which would give captive rodents and the like a place to burrow in and at the same time give them the opportunity to use their incisors for gnawing or nibbling. Such a device would be useful for pet rodents, e.g., hamsters, gerbils and guinea pigs, as well as for rodents that are maintained in captivity for commercial or experimental purposes.

It is an object of this invention to provide a device which will give captive rodents and the like a place to burrow in and at the same time give them the opportunity to use their incisors for gnawing or nibbling.

SUMMARY OF THE INVENTION

The present invention is an article of human manufacture comprising a housing having a cavity therein which is accessible from outside the housing by at least one opening. The cavity, at least when substantially empty, is of size and shape suitable for small animals such as rodent(s) to burrow into. When not at least substantially empty the cavity is at least partially filled with food suitable for the animal(s) to gnaw or nibble on. The novel article of manufacture is referred to herein as an "edible animal habitat".

The present invention also includes methods for making the edible animal habitats disclosed and claimed herein.

DETAILED DESCRIPTION OF THE INVENTION

The present invention provides devices which give small captive animals such as rodents a place to burrow in, and at the same time gives them the opportunity to use their incisors for gnawing or nibbling. The devices are based on the discovery that it is possible to fill the marrow cavity of large bones with food which small animals such as rodents like to nibble on. In this manner an "edible habitat" may be constructed which small animals can both burrow in and gnaw on.

The "edible habitats" of the invention are comprised of a housing that is suitable for small animals such as rodents to burrow into, and food that is suitable for the small animals to gnaw or nibble on. The housing has at least one cavity which is accessible from outside the housing by at least one opening. Alternatively the housing can be hollow and tunnel like, with openings to the outside at either end of the tunnel. The housing can be made of any suitable material. According to the invention, suitable materials include, but are not limited to, bone, stone, shell, wood, plastic, paper, rubber, metal, cement, paper, plaster, minerals, vitamins, or any combination of these materials. The housing can be a natural object, e.g., a bone, shell, stone or piece of wood, or it can be "synthetic". Synthetic housings can be constructed from any suitable material, e.g., plaster, cement, plastic, rubber, metal, paper, or ground bone, stone, shells, wood, etc. with suitable binder, or any combination of these or other materials. Housings can also be constructed from combinations of natural and synthetic materials, e.g., plaster of Paris to which ground shells have been added. The housings may be of any desirable size, and may be of any suitable color. By way of example, large ungulate animal bones with marrow cavities are suitable natural objects for use as housings when constructing habitats for small rodents. The large hoofstock bones may be colored to a suitable color with food grade dyes. Plastic pipes (e.g., those made of polyvinyl chloride) are suitable synthetic objects for use as housings when constructing habitats since they are readily available and come in a variety of sizes. The pipes can also be colored to any suitable color.

The size of the housing is not critical and will usually be dictated by the size of the animals which will burrow into it. In any given housing the inner cavity or tunnel should be large enough for the small animals (e.g., rodents) to burrow into, but preferably, still small or narrow enough to be "snug". Housings (and inner cavities or tunnels) for rabbits will of necessity be larger than those for mice, and those for gerbils and guinea pigs will be of a size intermediate between the two.

According to the teaching of the invention, the tunnel or cavity in the housing is at least partially filled with food suitable for small animals such as rodents to gnaw or nibble on. Suitable foods include any foods small animals such as rodents like to eat. Preferable foods are ones which allow the small animals to use their incisors. Prepared mixtures of gnawable animal foods (e.g., for mice, gerbils, guinea pigs, etc.) are commercially available from a variety of sources (e.g., Purina Mills, Inc., St. Louis, Mo. 63166; Leach Grain & Milling Co., Downey, Calif. 90241; Star Milling Co., Perris, Calif. 92370) and may be used to partially or completely fill the housing cavity. Alternatively, new mixtures can be created from ingredients such as nuts, seeds, grains, fruits, beans, flavorings, and binders, and the like. According to the teaching of the invention, the type of animal food used to fill the cavity is not critical as long as the small animals can gnaw or nibble on it.

The present invention includes methods for making edible habitats. According to one method, a housing having a cavity therein is provided. The cavity in the housing will have at least one opening thereto which is accessible from outside the housing, and will be of a size and shape suitable for small animals such as rodents to burrow into. Also according to the method, the cavity is filled, at least partially filled, with food suitable for small animals such as rodents to gnaw or nibble on. If the food is moist or soft when placed in the cavity, the housing and food combination may be dried by any suitable means until the food filling is hard and more suitable for animals to gnaw or nibble on. According to another method, a large bone having a cavity therein is provided. The cavity in the bone has at least one opening thereto which is accessible from outside the bone, and is of size and shape suitable for small animals, such as rodents, to burrow into. Also according to the invention, the bone cavity is filled, at least partially, with food suitable for the rodents to gnaw or nibble on. Again, if desirable, the bone and food filling may be dried until the food filling is hard and suitable for animals to gnaw or nibble on.

The following examples are presented for purposes of illustration only and should not be construed as limiting the scope of the claims of the present invention.

EXAMPLES

EXAMPLE 1

Edible Animal Habitat Made from Natural Bone

An edible animal habitat made from natural bone and filled with food suitable for small rodents, e.g., gerbils, to gnaw or nibble on is constructed as follows.

A. A beef limb bone is obtained from a slaughter house or other suitable source. The bone is cut to lengths of about 3-8 inches. The marrow is removed, and the bone is cleaned of meat and fat. The bone is then washed, sterilized and dried. If necessary the marrow cavity is enlarged so it is of size and shape suitable for gerbil(s) to burrow into. If desired the bone is dyed to desired color with a suitable food grade dye (e.g., Red Dye 40; SAFI, smart and final iris).

B. A food composition suitable for rodents such as gerbils to eat or nibble on may be made by mixing alfalfa meal, soybean meal, ground barley, ground oats, wheat bran, ground milo, linseed oil meal, vegetable oils (wheat germ oil, anise oil), methionine hydroxy analogue, Vitamin A acetate, Vitamin B-1 (thiamine), B-2 (riboflavin), B-6 (pyridoxine), B-12 (cobalamin), calcium pantothenate, Vitamin C (ascorbic acid), Vitamin D-2 (cholecalciferol), Vitamin D-3 (ergocalciferol), Vitamin E (tocopherol), Vitamin K (phylloquinone), biotin, niacin, choline chloride, magnesium sulfate, zinc oxide, iron sulfate, copper sulfate, calcium iodate, cobalt carbonate, solium selenite, salt, propionic acid (mold inhibitor), ethoxyquin (a preservative), and lignin sulfate (binder).

C. The hollow bone from step (A) is then filled, either partially or substantially, with the food composition from step (B). This can be done manually or mechanically.

D. Once filled with food composition, the bone may be dried by any suitable means, e.g., at a temperature of about 110° F. (43° C.) for about 24 hours, or until the food mixture is hard and dry. Preferably the drying is done in a drying room having good air circulation.

EXAMPLE 2

Edible Animal Habitat Made from Plastic Bone

An edible animal habitat made from plastic bone and filled with food suitable for rodents, e.g., mice, hamsters, gerbils, etc., to gnaw or nibble on is constructed as follows.

A. A plastic bone is molded like a piece of hollowed cow bone that is about 3-8 inches long and has an overall diameter of about 1½-2½ inches. The hollow bone cavity, which extends the length of the bone, is about 1¼-2¼ inches in diameter. The molded bone is cleaned and made as sterile as possible.

B. A food composition suitable for rodents such as mice, hamsters, gerbils, etc., to eat or nibble on may be made by mixing alfalfa meal, soybean meal, ground barley, ground oats, wheat bran, ground milo, linseed oil meal, vegetable oils (wheat germ oil, anise oil), methionine hydroxy analogue, Brewer's yeast, Vitamin A acetate, Vitamin B-1 (thiamine), B-2 (riboflavin), B-6 (pyridoxine), B-12 (cobalamin), calcium pantothenate, Vitamin C (ascorbic acid), Vitamin D-2 (cholecalciferol), Vitamin D-3 (ergocalciferol), Vitamin E (tocopherol), Vitamin K (phylloquinone), biotin, niacin, choline chloride, magnesium sulfate, zinc oxide, iron sulfate, copper sulfate, calcium iodate, cobalt carbonate, solium selenite, salt, propionic acid (mold inhibitor), ethoxyquin (a preservative), and lignin sulfate (binder).

C. The hollow plastic bone from step (A) is then filled, either partially or substantially with the food composition from step (B). This can be done manually or mechanically.

D. Once filled with food composition, the plastic bone may be dried by any suitable means, e.g., at a temperature of about 110° F. (43° C.) for about 24 hours or until the food filling is dry and hard. Preferably the drying is done in a drying room having good air circulation.

EXAMPLE 3

Edible Animal Habitat Made from Plaster of Paris

An edible animal habitat made from plaster of Paris, to which ground shells have been added, and filled with food suitable for rodents, e.g., mice, hamsters, gerbils, etc., to gnaw or nibble on is constructed as follows.

A. A bone composed of plaster of Paris and ground shells (2:1 plaster to shells by dry volume) is molded like a piece of hollowed cow bone that is about 3-8 inches long and has an overall diameter of about 1½-2½ inches. The hollow bone cavity, which extends the length of the bone, is about 1¼-2¼ inches in diameter. If desired the bone is dyed to desired color with a suitable food grade dye (e.g., Red Dye 40; SAFI, smart and final iris). The bone is cleaned and made as sterile as possible.

B. A food composition suitable for rodents such as mice, hamsters, gerbils, etc., to eat or nibble on may be made by mixing alfalfa meal, soybean meal, ground barley, ground oats, wheat bran, ground milo, linseed oil meal, vegetable oils (wheat germ oil, anise oil), methionine hydroxy analogue, Brewer's yeast, Vitamin A acetate, Vitamin B-1 (thiamine), B-2 (riboflavin), B-6 (pyridoxine), B-12 (cobalamin), calcium pantothenate, Vitamin C (ascorbic acid), Vitamin D-2 (cholecalciferol), Vitamin D-3 (ergocalciferol), Vitamin E (tocopherol), Vitamin K (phylloquinone), biotin, niacin, choline chloride, magnesium sulfate, zinc oxide, iron sulfate, copper sulfate, calcium iodate, cobalt carbonate, solium selenite, salt, propionic acid (mold inhibitor), ethoxyquin (a preservative), and lignin sulfate (binder).

C. The hollow plaster of Paris bone from step (A) is then filled, either partially or substantially with the food composition from step (B). This can be done manually or mechanically.

D. Once filled with food composition, the plaster of Paris bone may be dried by any suitable means, e.g., at a temperature of about 110° F. (43° C.) for about 24 hours or until the food filling is dry and hard. Preferably the drying is done in a drying room having good air circulation.

EXAMPLE 4

Edible Habitat Made from Plastic Pipe

An edible habitat made from plastic pipe and filled with food suitable for rodents, e.g., chinchillas, guinea pigs and dwarf rabbits, to gnaw or nibble on is constructed as follows.

A. A piece of hollow plastic pipe (preferably made of polyvinyl chloride) about 10–14 inches long and about 6 inches in diameter is used as the housing for this edible habitat. The pipe piece is cleaned and made as sterile as possible.

B. A food composition suitable for rodents such as chinchillas, guinea pigs and dwarf rabbits to eat or nibble on may be made by mixing alfalfa meal, soybean meal, ground beet pulp, ground oats, wheat bran, dried whey, ground corn, soybean oil, methionine hydroxy analogue, Brewer's yeast, Vitamin A acetate, Vitamin B-1 (thiamine), B-2 (riboflavin), B-6 (pyridoxine), B-12 (cobalamin), calcium pantothenate, Vitamin C (ascorbic acid), Vitamin D-2 (cholecalciferol), Vitamin D-3 (ergocalciferol), Vitamin E (tocopherol), Vitamin K (phylloquinone), biotin, niacin, choline chloride, magnesium sulfate, zinc oxide, iron sulfate, copper sulfate, calcium iodate, cobalt carbonate, solium selenite, salt, propionic acid (mold inhibitor), ethoxyquin (a preservative), and lignin sulfate (binder).

C. The hollow plastic pipe from step (A) is then filled, either partially or substantially with the food composition from step (B). This can be done manually or mechanically.

D. Once filled with food composition, the plastic pipe may be dried by any suitable means, e.g., at a temperature of about 110° F. (43° C.). Preferably the drying is done in a drying room with air circulating for about 30 hours or until the filling is hard and dry. Preferably the drying is done in a drying room having good air circulation.

EXAMPLE 5

Edible Habitat Made from Rubber Tubing

An edible habitat made from rubber tubing and filled with food suitable for rodents, e.g., rabbits, to gnaw or nibble on is constructed as follows.

A. A piece of hollow rubber tubing about 18–24 inches long and about 8 inches in diameter is used as the housing for this edible habitat. The rubber tubing is cleaned and made as sterile as possible.

B. A food composition suitable for rabbits to eat or nibble on may be made by mixing alfalfa meal, barley, wheat bran with ground wheat screenings, soybean meal, cane molasses, milo, soybean oil, ground corn, methionine hydroxy analogue, Brewer's yeast, Vitamin A acetate, Vitamin B-1 (thiamine), B-2 (riboflavin), B-6 (oyridoxine), B-12 (cobalamin), calcium pantothenate, Vitamin C (ascorbic acid), Vitamin D-2 (cholecalciferol), Vitamin D-3 (ergocalciferol), Vitamin E (tocopherol), Vitamin K (phylloquinone), biotin, niacin, choline chloride, magnesium sulfate, zinc oxide, iron sulfate, copper sulfate, calcium iodate, cobalt carbonate, solium selenite, salt, propionic acid (mold inhibitor), ethoxyquin (a preservative), and lignin sulfate (binder).

C. The hollow rubber tubing from step (A) is then filled, either partially or substantially filly, with the food composition from step (B). This can be done manually or mechanically.

D. Once filled with food composition, the rubber tubing may be dried by any suitable means, e.g., at a temperature of about 110° F. (43° C.). Preferably the drying is done for about 30 hours, in a drying room having good air circulation.

Conclusion

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. An edible rodent habitat comprising a housing having a substantially tunnel-like cavity therein, wherein said cavity extends substantially about a given length, said length being at least the length of a rodent so said rodent can completely burrow into said cavity, wherein said cavity has at least one opening thereto which is accessible from outside said housing, and wherein said cavity is at least partially filled with solid, gnawable rodent food.

2. A housing according to claim 1 wherein said housing comprises at least one of the following components: bone, stone, wood, plastic, rubber, metal, cement, shell, plaster, minerals and vitamins.

3. A housing according to claim 1 wherein said housing is colored.

4. A rodent according to claim 1 wherein said rodent is a gerbil, a mouse, a rat, a hamster, a guinea pig, a chinchilla, or a rabbit.

5. A solid gnawable rodent food according to claim 1 wherein said food comprises at least one of the following ingredients: nuts, seeds, fruits, beans, grains, fats, oils, sugars, and yeast.

6. A food according to claim 5 also comprising at least one of the following supplements: vitamins, minerals, protein, preservatives, colorings, binders, flavorings, preservatives, anti-bacterial agents, anti-fungal agents.

7. An edible rodent habitat comprising a bone having a tunnel-like cavity therein wherein said cavity extends substantially the length of said bone, said length being at least the length of a rodent so said rodent can completely burrow into said cavity, wherein said cavity has at least one opening thereto which is accessible from outside said bone, and wherein said cavity is at least partially filled with solid, gnawable rodent food.

8. A bone according to claim 7 wherein said bone is natural bone from one of the following ungulate animals: cows, bulls, buffalo, swine, sheep, oxen, horses, and ponies.

9. A bone according to claim 8 wherein said bone is a leg bone.

10. A bone according to claim 7 wherein said bone is synthetic, and is comprised of at least one of the following materials: plastic, rubber, metal, cement, shell, plaster, minerals, and vitamins.

11. A rodent according to claim 7 wherein said rodent is a gerbil, a mouse, a rat, a hamster, a guinea pig, a chinchilla, or a rabbit.

12. A food according to claim 7 wherein said food is comprised of at least one of the following ingredients: nuts, seeds, fruits, beans, grains, fats, oils, sugars, and yeast.

13. A food according to claim 12 wherein said food also comprises at least one of the following supplements: vitamins, minerals, protein, preservatives, colorings, binders, flavorings, preservatives, anti-bacterial agents, and anti-fungal agents.

14. A bone according to claim 7 wherein said bone is colored.

15. An edible rodent habitat comprising a bone having a tunnel-like cavity therein wherein said cavity extends substantially about a given length, said length being at least the length of a rodent so said rodent can completely burrow into said cavity, wherein said cavity has at least two openings thereto which are accessible from outside said bone, wherein said cavity is at least partially filled with solid, gnawable rodent food.

16. A bone according to claim 15 wherein said bone is colored.

17. A rodent according to claim 15 wherein said rodent is a gerbil, a mouse, a rat, a hamster, a guinea pig, a chinchilla, or a rabbit.

18. A solid gnawable rodent food according to claim 15 wherein said food comprises at least one of the following ingredients: nuts, seeds, fruits, beans, grains, fats, oils, sugars, and yeast.

19. A food according to claim 18 also comprising at least one of the following supplements: vitamins, minerals, protein, preservatives, colorings, binders, flavorings, preservatives, anti-bacterial agents, anti-fungal agents.

20. A method for making an edible rodent habitat comprising:

providing a housing having a tunnel-like cavity therein, wherein said cavity extends substantially about a given length, said length being at least the length of a rodent so said rodent can completely burrow into said cavity, wherein said cavity has at least one opening thereto which is accessible from outside said housing, and filling, at least partially, said cavity with solid, gnawable rodent food.

21. A method according to claim 20 wherein said housing is a bone from a ungulate animal which has been washed, dried and sterilized before being filled with solid gnawable rodent food.

22. A method according to claim 20 wherein said housing is dyed with food grade dye.

23. A method for making an edible rodent habitat comprising providing a leg bone from an ungulate animal which has been washed, dried and sterilized, wherein said bone has a tunnel-like cavity therein extending substantially about the length of said bone, wherein said cavity has at least one opening thereto which is accessible from outside said bone, and filling, at least partially, said cavity with solid, gnawable rodent food.

* * * * *